United States Patent [19]

Nagamoto et al.

[11] Patent Number: 4,883,623
[45] Date of Patent: Nov. 28, 1989

[54] METHOD FOR PRODUCING A GOLF CLUB HEAD

[75] Inventors: Itsushi Nagamoto; Tatsuo Nakanishi; Tomoharu Yamashita, all of Hamamatsu, Japan

[73] Assignee: Yamaha Corporation, Japan

[21] Appl. No.: 296,848

[22] Filed: Jan. 12, 1989

Related U.S. Application Data

[63] Continuation of Ser. No. 092,431, Sep. 3, 1987, abandoned.

[30] Foreign Application Priority Data

Nov. 28, 1986 [JP] Japan .............................. 61-285552
Dec. 27, 1986 [JP] Japan .............................. 61-313459
Sep. 8, 1987 [JP] Japan .............................. 61-211223

[51] Int. Cl.$^4$ .................. B29C 33/12; B29C 45/14; B29C 45/16; B29C 45/36
[52] U.S. Cl. .................. 264/108; 264/257; 264/258; 264/278; 264/317; 264/279; 273/167 R
[58] Field of Search .............. 264/108, 257, 258, 317, 264/278, 279, 279.1, DIG. 44

[56] References Cited

U.S. PATENT DOCUMENTS

| 2,995,781 | 8/1961 | Sipler | 264/137 |
| 4,451,041 | 5/1984 | Hayashi | 264/257 |
| 4,464,324 | 8/1984 | Hager | 264/221 |
| 4,581,190 | 4/1986 | Nagamoto | 264/317 |
| 4,614,627 | 9/1986 | Curtis | 264/DIG. 44 |
| 4,636,422 | 1/1987 | Harris | 264/257 |
| 4,650,626 | 3/1987 | Kurokawa | 264/DIG. 44 |
| 4,786,347 | 11/1988 | Angus | 264/257 |

Primary Examiner—Jay H. Woo
Assistant Examiner—Jeremiah F. Durkin, II
Attorney, Agent, or Firm—Lerner, David, Littenberg, Krumholz & Mentlik

[57] ABSTRACT

A method of forming a golf club head by placing an infusion tube with a core in a mold. Sheets of long fibrous material are placed around the core and the mold is closed. Fiber reinforced plastic is forced into the mold and a substantial portion passes through the sheets of long fiber reinforcement and orients the fiber. The material is hardened and the golf club head is removed from the mold.

6 Claims, 6 Drawing Sheets

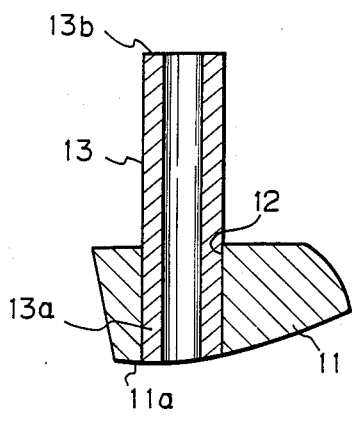
Fig. 1
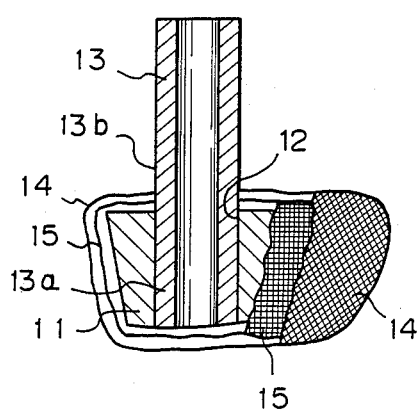
Fig. 2A
Fig. 2B
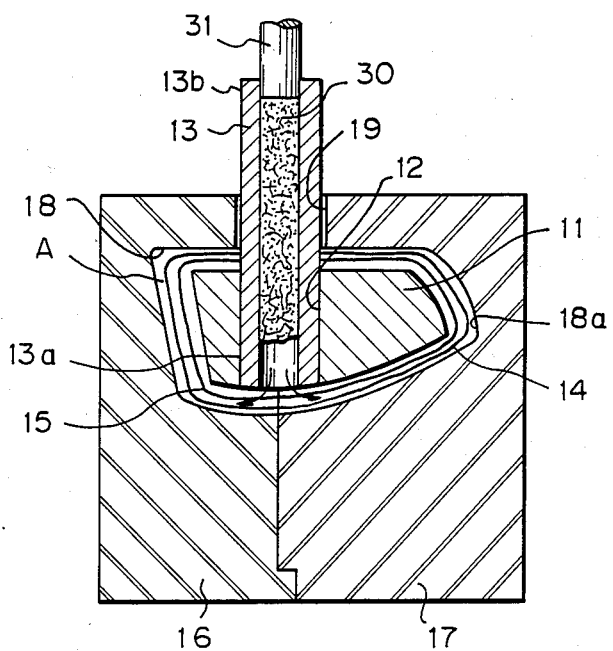

METHOD FOR PRODUCING A GOLF CLUB HEAD

This is a continuation of application Ser. No. 092,431 filed 9/3/87, now abandoned.

BACKGROUND OF THE INVENTION

The present invention relates to improved method for producing a golf club head, and more particularly related to improvement in production of a wood-type golf club head having an FRP (fiber reinforced plastics) shell.

In one conventional method for producing such a golf club head, fibers impregnated with thermosetting synthetic resin are hardened halfway to form a crude FRP shell which is then shaped into a desired configuration. In this case, short fibers of about 1 mm length are used for reinforcement. Use of such short fibers in the shell, however, rather lowers the surface strength of the product.

In another conventional method, short fibers are kneaded with thermoplastic synthetic resin to form a crude mixture which is then subjected to injection shaping. In this case again, use of short fibers lowers strength of the product despite its easy processing.

In the other conventional method, a crude core is placed in position within the cavity of a mold while leaving a space between the crude core and the cavity wall and crude FRP shell is infused under pressure into the space. In this case, infusion pressure of the crude FRP shell tends to drive the crude core out of its initially set position, thereby disturbing the balance of weight of the product. Though various expedients are proposed to remove such ill influence of the infusion pressure, they in most cases have ill side effects such as scars on the surface of the product.

Aside from the problems of surface strength and balance of weight, general use of carbon fibers for reinforcement in the conventional art blackens the surface of the product and increases thermal adsorption during use, both being unwelcome from the view points of commercial value and function stability.

SUMMARY OF THE INVENTION

It is one object of the present invention to produce a golf club head with increased surface strength.

It is another object of the present invention to remove ill influence of infusion pressure during production of a golf club head via infusion of crude FRP shell.

It is the other object of the present invention to produce a golf club head of beautiful surface tint and low thermal adsorption.

In accordance with the basic aspect of the present invention, a crude core is attached near one end of an infusion tube, the crude core is wrapped with one or more fibrous sheets containing long fibers, the crude core is then placed in position in the cavity of a mold by provisionally securing the infusion tube to the mold with the one end spacedly facing the wall of the cavity, a crude FRP shell is infused into the cavity of the mold via the infusion tube, and the mold is heated for hardening of the crude FRP shell.

BRIEF DESCRIPTION OF THE DRAWINGS

FIGS. 1 to 5 are sectional side views for showing operational steps of one embodiment of the present invention.

DESCRIPTION OF PREFERRED EMBODIMENTS

Figure 3:
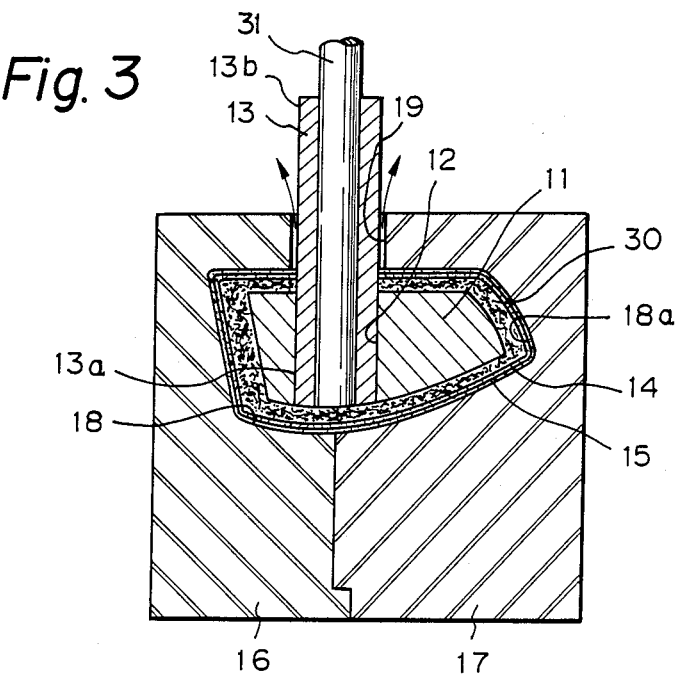

As briefly stated above, the method of the first embodiment is characterized by wrapping the crude core with one or more fibrous sheets after attachment to the infusion tube, and is shown in FIGS. 1 to 5.

As shown in FIG. 1, a crude core 11 is made of low melting point alloy and an inserted hole 12 is made through the crude core 11 from the top to bottom face. Next, an infusion tube 13 is inserted into the insert hole 13 with its one end 13a opening in the bottom face of the crude core 11. The crude core 11 is then loosely wrapped with two layers of fibrous sheets 14 and 15.

Next, as shown in FIGS. 2A and 2B, the crude core 11 is placed in position within the cavity 18 of a splittable mold made of a pair of mold halves 16 and 17 while leaving a prescribed size of peripheral gap A. The infusion tube 13 is inserted through a mold hole 19 with the other end 13b being placed outside the mold. By fastening the mold halves 16 and 17, the infusion tube 13 is provisionally secured to the mold and the position of the crude core 11 within the cavity 18 is fixed. The size of the peripheral gap A corresponds to the thickness of the FRP shell in the produced golf club head.

Preferably one or more air vents are formed through the mold in communication with the peripheral gap A for escape of air at infusion of the crude FRP shell. Further, suitable attachments such as a face plate and/or weight pieces are placed in position within the mold cavity 18. After such setting of the crude core 11 and other elements within the mold cavity 18, crude FRP shell 30 is force infused via the infusion tube 13 by means of a piston 31 so that it should fill the peripheral gap A. During this infusion of the crude FRP shell, the fibrous sheets 14 and 15 are pressed, for orientation of their long fibers, against the wall 18a of the cavity 18 due to infusion pressure. Air in the gap A may escape through the above-described air vents for easy infusion of the FRP shell. Even when no air vents are formed, the air may escape through the clearance between the infusion tube 13 and the mold. When the peripheral gap A is fully filled with the crude FRP shell as shown in FIG. 3, the mold is heated for hardening of the crude FRP shell.

Figure 4:
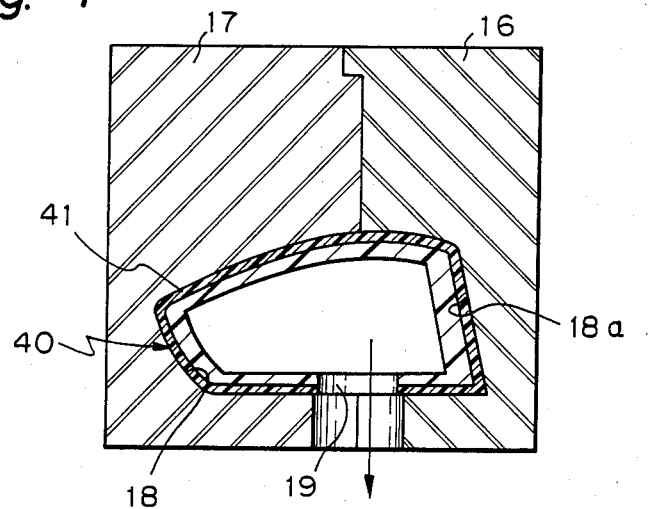

After hardening of the crude FRP shell to a FRP shell, the mold is reheated for melting of the crude core made of low melting point alloy and the infusion tube 13 is removed off the mold. Then the melted crude core can be automatically removed outside the mold through the insert hole 19 as shown in FIG. 4.

Figure 5:
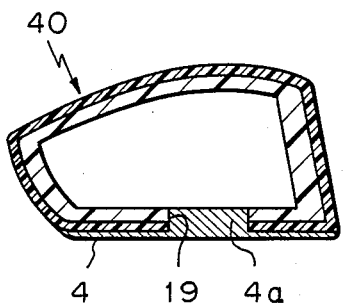
Figure 6:
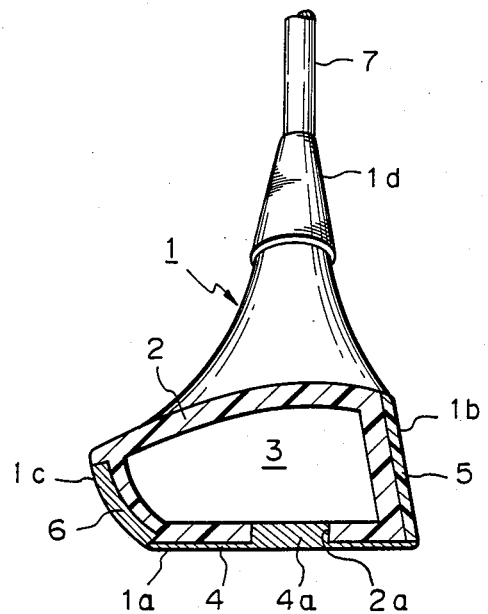
FIG. 6 is a sectional side view of one example of the golf club head produced by the method in accordance with one embodiment of the present invention.

Finally, a sole plate 4 is attached in position to the FRP shell 40 and the insert hole 19 is closed by a projection 4a on the sole plate 4 as shown in FIG. 5 to form a golf club head such as shown in FIG. 6.

In FIG. 6, the main body 1 of the golf club head includes an FRP shell accommodating a center cavity 3. The surface region of the FRP shell is occupied with number of oriented long fibers. The sole plate 4 is attached to the head sole face 1a of the main body 1, the striking face 1b is accompanied with a face plate 5 made of, for example, hardened FRP or ceramics and the back face 1c is provided with a weight element 6. The main body 1 is connected to a shaft 7.

For formation of the crude FRP shell, carbon, glass or polyamide fibers are preferably used. For impregnation with the synthetic resin, these fibers are given in the form of a cloth or a bundle of fibers of 20 to 50 mm length.

Carbon or polyaramide fibers are preferably used for formation of the fibrous sheet for wrapping the crude FRP shell.

In accordance with the present invention, presence of the oriented long fibers in the surface region of the FRP shell well increases the surface strength of the product. Further, since the one open end of the infusion tube faces the cavity wall during infusion of the crude FRP shell, infusion pressure has no virtual influence on the initially set position of the crude core in the mold cavity. So, the product has a good balance of weight as designed.

The method of the second embodiment is characterized by use of long fibers in the crude FRP shell. More specifically, carbon, aramide or boron fibers are impregnated with non-foamable synthetic resin. In this case again, presence of long fibers in the surface region of the FRP shell well increases the surface strength of the product.

Figure 7:
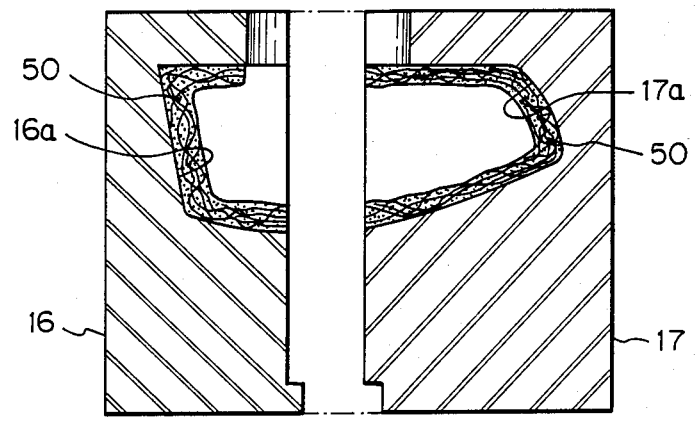
FIGS. 7 to 10 are sectional side view for showing operational steps of another embodiment of the present invention.

The method of this second embodiment may include operational steps shown in FIGS. 7 to 10. First as shown in FIG. 7, a splittable mold made of a pair of mold halves 16 and 17 are prepared and crude FRP shell 50 is attached to cavity walls 16a and 17a. The crude FRP shell 50 contains long fibers impregnated with non-foamable synthetic resin. After depositing proper accessories the mold halves 16 and 17 are fastened together whilst clamping an infusion tube 13 opening in the space surrounded by the crude FRP shell 50.

Figure 8:
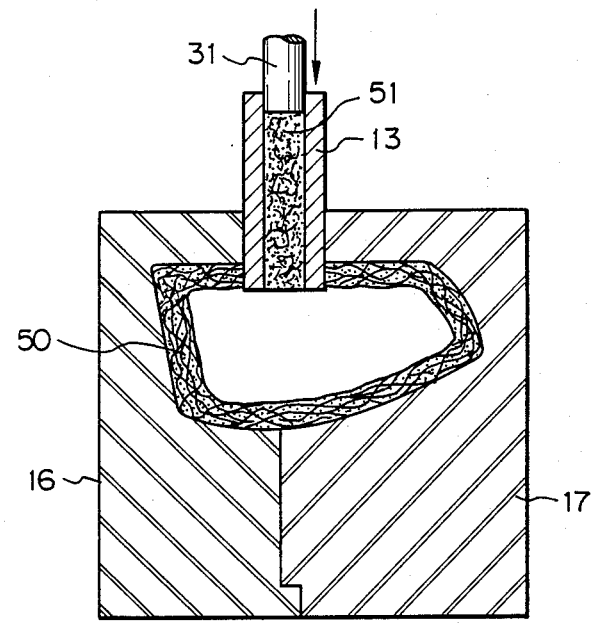
Figure 9:
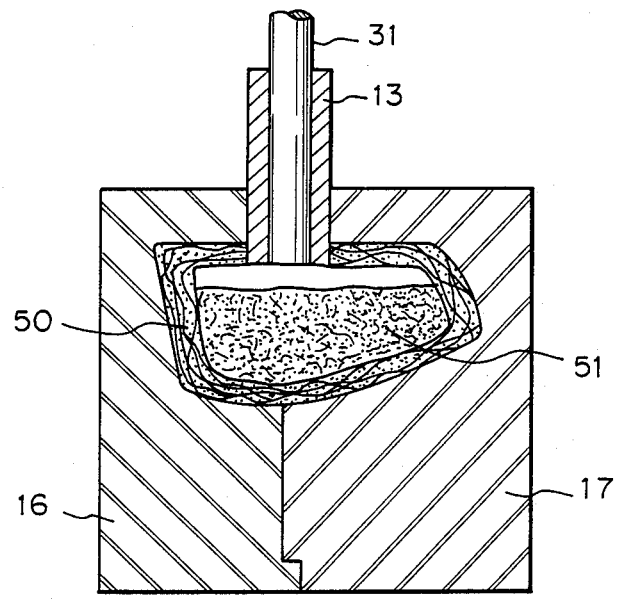
Figure 10:
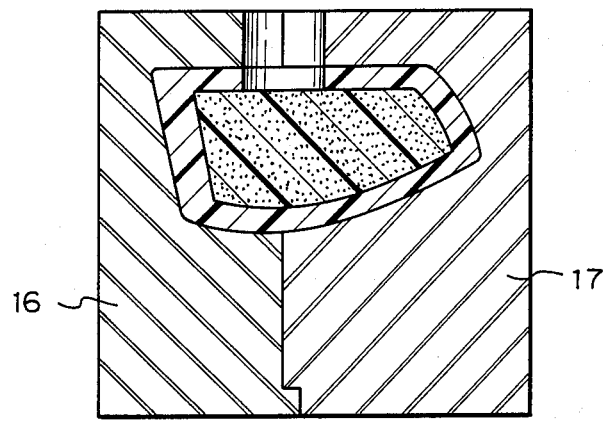

Next, as shown in FIGS. 8 and 9 crude core 51 is infused into the space through the infusion tube 13 by assistance of a piston 31. This crude core 51 includes short fibers impregnated with foamable synthetic resin. Aramide fibers are added for reinforcement. After complete infusion, the mold is heated for hardening as shown in FIG. 10.

Figure 11:
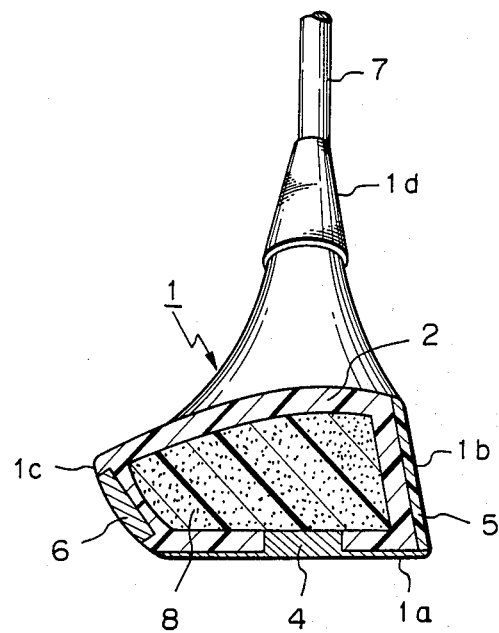
FIG. 11 is a sectional side view of another example of the golf club head produced by the method in accordance with another embodiment of the present invention.

One example of the product is shown in FIG. 11, in which a core 8 is fully embraced by an FRP shell 2.

The method of the third embodiment of the present invention is characterized by use of aramide which fibers well improves the appearance of the product and lowers thermal adsorption.

We claim:

1. In a method for forming a golf club head in a split mold having a mold cavity to define the size and shape of the golf club head, the steps of:
   a. forming a sized and shaped crude core with an infusion tube connected thereto and extending from the top to the bottom of the crude core so that the infusion tube has an end opening to the exterior of the bottom of the crude core,
   b. covering the outersurface of the crude core with sheets of long fibrous material so that the sheets also cover the end opening of the infusion tube,
   c. setting the covered crude core and infusion tube in the mold so that the infusion tube is held by the closed mold to fix the covered crude core in predetermined spaced relation to the walls of the mold cavity to define therewith a peripheral cavity about the crude core in which the fibrous sheet material is disposed in the peripheral space between the crude core and the mold cavity,
   d. forcing fiber reinforced plastic under pressure from the open end of the infusion tube so that a substantial portion passes through the sheets of fibrous material pressing and orienting the combined fiber reinforced plastic and occluded fibrous sheets of materials against the walls of the mold cavity,
   e. heating the mold to harden the fiber reinforced plastic in assembled position about the occluded fibrous sheets of material to form a shell having the desired size and shape of the golf club head, and
   f. opening the split mold and separating the formed golf club head from the mold cavity.

2. In the method as claimed in claim 1, including the steps of providing at least two sheets of long fiber material to cover the crude core and open end of the infusion tube.

3. In the method as claimed in claim 1 the steps of
   a. providing two sheets of different fiber length material,
   b. covering the crude core and open end of the infusion tube with the said two sheets of long fiber material.

4. In the method as claimed in claim 1 including the steps of:
   a. reheating the mold to enable the infusion tube to be removed from the crude core in the mold cavity,
   b. pouring the melted crude core from the formed shell defining the golf club head via the opening left by removal of the infusion tube.

5. In the method as claimed in claim 1 including the steps of
   a. providing a fibrous reinforced plastic with aramide fibers therein, and
   b. said aramide fibers disposed to orient and align during the steps of forcing the fibrous reinforced plastic against the wall of the said peripheral cavity formed in the mold.

6. In a method for forming a golf club head in a split mold having a mold cavity to define the size and shape of the golf club head, the steps of
   a. forming a sized and shaped crude core from a low melting alloy with an infusion tube connected thereto and extending from the top to the bottom of the crude core so that the infusion tube has an end opening to the exterior of the bottom of the crude core,
   b. covering the outer surface of the crude core with sheets of long fibrous material so that the sheets also cover the open end of the infusion tube,
   c. setting the covered crude core and infusion tube in the mold so that the infusion tube is held by the closed mold to fix the covered crude core in predetermined spaced relation to the walls of the mold cavity so that the crude core defined therewith a peripheral cavity and the fibrous sheet material is disposed in this peripheral space between the crude core and the wall of the mold cavity,
   d. forcing fiber reinforced plastic under pressure from the open end of the infusion tube so that a substantial portion thereof passes through the fibrous sheets of material and presses and orients the combined fiber reinforced plastic and occluded fibrous sheets of material against the wall of the mold cavity, e. heating the mold to harden the fiber reinforced plastic in assembled position about the occluded fibrous sheets of material to form a shell having the desired size and shape of the golf club head and to melt the crude core, f. removing the melted crude core from the mold cavity, and g. separating the formed golf club head from the mold.

* * * * *